(12) United States Patent
Krause et al.

(10) Patent No.: US 8,033,057 B2
(45) Date of Patent: Oct. 11, 2011

(54) SEALING ARRANGEMENT FOR SEALING AND GUIDING A POWERED WINDOW PANE, PARTICULARLY OF A MOTOR VEHICLE

(75) Inventors: Fritz Krause, Hergatz (DE); Felix Muga, Logrono (ES)

(73) Assignee: Metzeler Automotive Profile Systems GmbH, Lindau/Bodensee (DE)

( * ) Notice: Subject to any disclaimer, the term of this patent is extended or adjusted under 35 U.S.C. 154(b) by 1322 days.

(21) Appl. No.: 10/550,043

(22) PCT Filed: Mar. 18, 2004

(86) PCT No.: PCT/EP2004/002836
§ 371 (c)(1),
(2), (4) Date: Sep. 26, 2006

(87) PCT Pub. No.: WO2004/085184
PCT Pub. Date: Oct. 7, 2004

(65) Prior Publication Data
US 2007/0089371 A1    Apr. 26, 2007

(30) Foreign Application Priority Data
Mar. 26, 2003    (DE) .................................. 103 13 601

(51) Int. Cl.
*E06B 7/16* (2006.01)

(52) U.S. Cl. ........ 49/441; 49/490.1; 49/495.1; 49/498.1
(58) Field of Classification Search .................... 49/440, 49/441, 475.1, 495.1, 490.1, 498.1
See application file for complete search history.

(56) References Cited

U.S. PATENT DOCUMENTS
2,917,340 A * 12/1959 Hencken .................... 112/427
3,333,364 A * 8/1967 Herr ................................ 49/441
(Continued)

FOREIGN PATENT DOCUMENTS
EP       0 704 597 A2    4/1996
(Continued)

*Primary Examiner* — Jerry Redman
(74) *Attorney, Agent, or Firm* — Stephen B. Salai, Esq.; Michael J. Didas, Esq.; Harter Secrest & Emery LLP

(57) ABSTRACT

The invention relates to a sealing arrangement for sealing and guiding a powered window pane (40), particularly of a motor vehicle. Said sealing arrangement is provided with a seal (20) produced as a single part from an elastically deformable material. The inventive sealing arrangement is also provided with a sash (10) which frames the window pane (40) and to which the seal (20) can be fixed. Said sash (10) comprises an inner flange (11) and an outer flange (12). The seal (20) comprises an inner side section (21) that can be fixed to the inner flange (11), an outer side section (22) that can be fixed to the outer flange (12), and a base portion (23) located outside the cavity portion (13). The aim of the invention is to achieve a universal embodiment of the seal (20). To this end, an inner sealing element (25) arranged on the inner leg portion (21), and an outer sealing element (26) arranged on the outer leg portion (22), are respectively embodied as a hollow chamber and provided with a contact surface area (29, 30) that can be applied to a side surface (41, 42) of the window pane (40). Said contact surface areas (29, 30) are embodied in two directions (x, y) extending perpendicularly in relation to each other, in such a way that the window pane (40) can be reversibly displaced between the inner sealing element (25) an the outer sealing element (26).

16 Claims, 6 Drawing Sheets

U.S. PATENT DOCUMENTS

| | | | |
|---|---|---|---|
| 4,470,223 A * | 9/1984 | Mesnel | 49/441 |
| 4,809,463 A | 3/1989 | Schroder et al. | |
| 5,209,019 A * | 5/1993 | Morita | 49/490.1 |
| 6,138,414 A * | 10/2000 | Ohmori et al. | 49/441 |
| 6,185,869 B1 * | 2/2001 | Kawai | 49/441 |
| 7,487,615 B2 * | 2/2009 | Watanabe et al. | 49/441 |
| 2002/0056234 A1 * | 5/2002 | Tanaka et al. | 49/375 |
| 2003/0019160 A1 * | 1/2003 | Oda et al. | 49/498.1 |

FOREIGN PATENT DOCUMENTS

| | | |
|---|---|---|
| EP | 0 872 369 A1 | 10/1998 |
| GB | 2150966 A * | 7/1985 |

* cited by examiner

SEALING ARRANGEMENT FOR SEALING AND GUIDING A POWERED WINDOW PANE, PARTICULARLY OF A MOTOR VEHICLE

FIELD OF THE INVENTION

The invention relates to a sealing arrangement for sealing and guiding a powered window pane, particularly of a motor vehicle. The sealing arrangement comprises a seal or weather strip made integrally of an elastomer. In addition the sealing arrangement is provided with a sash framing the window pane and to which the seal is securable. The sash comprises an inner flange and an outer flange spaced away from the inner flange, the outer flange forming at least one door cavity for accommodating the window pane when lowered, and a first guiding portion for guiding the window pane. The seal has a U-shaped cross-section and comprises an inner leg portion securable to the inner flange, an outer leg portion securable to the outer flange and, remote from the door cavity portion, a base portion. The base portion, inner leg portion and outer leg portion are each provided with a sealing element sealing and/or guiding the window pane.

BACKGROUND ART

A sealing arrangement for sealing and guiding a powered window pane is described in EP 0 155 641 B1. This known sealing arrangement comprises an elastomer seal secured to a frame of the window pane. The seal is composed of several portions each made separately and joined together to a seal frame by adhesive bonding or vulcanizing. Although making the individual portions of the seal separately permits configuring the seal frame functionally adapted to the diverse requirements on the seal in the various functional portions, for example in the region of a door cavity housing the window pane, or of a window guide providing side guidance of the window pane, it has the drawback of the complications associated with separate production of the individual portions of the seal involving relatively high production costs. This applies correspondingly to a sealing arrangement as known from EP 0 872 369 A1 for the window pane of a hand-cranked window composed of an outer profile seal and an inner profile seal, both of which are provided with sealing elements configured as hollow chambers in contact with the side surface of the window pane. The outer profile seal is configured as a closed ring whereas the inner profile seal is replaced in the region of a door cavity for the window by a separate profile seal.

By contrast EP 0 282 919 B1 and EP 0 704 597 A2 disclose a sealing arrangement comprising a seal extruded integrally from an elastomer. Cross-sectionally the seal is roughly U-shaped and features a base portion, an inner leg portion secured to an inner flange of a sash framing the window pane and an outer leg portion secured to an outer flange of the sash. In the region of the door cavity housing the window pane the base portion is removed so that the leg portions form an inner and an outer door cavity seal. Additionally the base portion and the leg portions are each provided with a sealing element sealing and/or guiding the window pane. The seal known from EP 0 282 919 B1 comprises sealing elements all of which are configured as sealing lips. The seal known from EP 0 704 597 A2 comprises sealing elements likewise configured as sealing lips at the base portion and at the outer leg portion, but is provided with a sealing element configured as a hollow chamber at the inner leg portion. The drawback in both of these configurations is the unsatisfactory sealing and guiding performance of the sealing elements as regards the diverse requirements on the seal in the various functional portions.

BRIEF DESCRIPTION OF THE INVENTION

The invention is based on the objective of sophisticating a sealing arrangement of the aforementioned kind such that for relatively cost-effective production a universal configuration is now achieved satisfying the various requirements on the seal in the individual functional portions.

To achieve this objective it is provided for in a sealing arrangement having the aforementioned features as set forth in claim 1 that an inner sealing element arranged on the inner leg portion and an outer sealing element arranged on the outer leg portion are each configured as a hollow chamber and provided with a surface area for contacting the side surface of the window pane, the contact surface areas being configured in two directions each perpendicular to the other such that the window pane can be powered reversible between the inner sealing element and the outer sealing element.

The sealing arrangement in accordance with the invention is the result of having discovered that configuring the sealing elements arranged on the inner leg portion and the outer leg portion as hollow chambers permits introducing the window pane between the inner leg portion and the outer leg portion in opposite directions, in thus making it possible to make use of the seal, for example, in both the door cavity portion receiving the window pane and in the region of a portion opposite the door cavity portion receiving the upper edge of the window pane. Configuring the inner sealing element and the outer sealing element as a hollow chamber ensures additionally satisfactory guidance of the window pane in the region of the side guide portions. Contributing furthermore to a universal configuration of the seal, satisfying both the various requirements on the seal in the individual functional portions are the contact surface areas of the sealing elements ensuring reversible motion of the window pane between the inner sealing element and the outer sealing element in two directions perpendicular to each other. The contact surface areas provided on facing sides of the sealing elements formed, for example, by asymmetrical hollow chambers ensure that the window pane is now properly guided whilst receiving an effective weather-seal in both the region of the, as a rule, vertically oriented guiding portions and in the region of the, as a rule, horizontally oriented door cavity portion and receiving portion.

Advantageous further embodiments of the sealing arrangement in accordance with the invention read from the subject matter of claims 2 to 13.

Accordingly, it is of advantage to configure a central sealing element arranged on the base portion as a hollow chamber and provided with a surface area for contacting an end face of the window pane. Configuring the central sealing element as a hollow chamber ensures, for one thing, satisfactory guidance of the side edges of the window pane in the region of the guiding portions and, for another, a proper counterhold for the upper end of the window pane in the region of a portion receiving the upper edge of the window pane.

It is furthermore of advantage when at least one of the contact surface areas is provided with a friction-reducing flock coating to prevent nuisance friction creaking.

In one preferred aspect of the sealing arrangement in accordance with the invention the inner leg portion is provided with a slot for positive and/or non-positive engagement of the inner flange for satisfactorily securing the seal to the sash. As an alternative or additionally thereto for this purpose the outer leg portion may also be provided slotted for engaging the outer flange positively and/or non-positively. For a durable fastening of the seal to the sash it is expedient to provide retaining lips arranged in the slot.

Preferably the sealing arrangement in accordance with the invention comprises a bracing element for strengthening the inner leg portion and/or the outer leg portion, The bracing element is preferably made of a metallic material and configured roughly U-shaped in cross-section. Additionally, the bracing element is expediently provided with a plurality of perforations to render the bracing element adequately conformable for arranging the seal in one piece along the various functional portions of the sash.

For simple and cost-effective production the seal is expediently extruded from an elastomer, preferably a thermoplastic elastomer (TPE) or ethylene propylene diene monomer (EPDM).

To prevent the extruded seal being spoiled by "hungry horse" furrows in the surface of the seal caused by the perforations in a bracing element embedded in the seal, the inner leg portion and/or the outer leg portion are advantageously provided with a hollow chamber covering the bracing element at least in part, the hollow chamber being preferably divided into several portions by at least one web. Providing the hollow chamber results in the hungry horse effect now occurring, at the most, at an inner wall of the hollow chamber and thus at an obscure surface of the seal without spoiling the visual appeal. The web dividing the hollow chamber into two portions, for example, is dimensioned so that, on the one hand, coinciding of the hollow chamber during extrusion of the seal is effective prevented, and, on the other, the hungry horse spoilage possibly appearing at an inner wall of the hollow chamber is not transferred to the surface of the seal.

In one preferred aspect of the sealing arrangement in accordance with the invention the sash comprises a middle segment interconnecting the inner flange and outer flange in the region of the first guiding portion and/or of a portion receiving the upper edge of the window pane, the middle segment preferably having a roughly U-shaped cross-section. The middle segment connecting the inner flange to the outer flange endows the sash, for example in the region of the first guiding portion of the receiving portion with a substantially slotted configuration clasping the end face and edge portion of the side surfaces of the window pane.

Preferably the base portion is arranged at the middle segment, resulting in exact positioning of the seal in the sash.

It is furthermore of advantage when in the region of the door cavity portion the sash is free from the middle segment and the seal is free from the base portion, enabling the window pane to be lowered into a door cavity receiving the window pane between the inner leg portion forming the inner door cavity seal and the outer leg portion forming the outer door cavity seal.

In a further preferred aspect of the sealing arrangement in accordance with the invention the sash comprises a second guiding portion in which the middle segment is separated from the inner flange and the outer flange and the base portion is separated from the inner leg portion and the outer leg portion. The second guiding portion guiding, for example, a side edge of the window pane differs from the door cavity portion by the middle segment of the sash and the base portion of the seal not being fully removed, but instead arranged at a defined spacing away from the inner flange and outer flange and the inner leg portion and outer leg portion respectively. This arrangement now permits a functional separation between the side guidance of the window pane by the base portion and the middle segment, on the one hand, and a satisfactory seal of the window pane by the inner leg portion secured to the inner flange and the outer leg portion secured to the outer flange, on the other. Separating the function in this way results in a wealth of options for highlighting the visual appeal of the window pane other than that of the conventional design, for example, of a motor vehicle.

In this context it has thus been discovered to be of advantage to configure the spacing between the middle segment and the inner flange and outer flange such that it is continuously rendered wider along the second guiding portion. For example, the spacing between the receiving portion and the door cavity portion may be configured conically flared or hyperbolical.

BRIEF DESCRIPTION OF THE DRAWINGS

Details and further advantages of the sealing arrangement in accordance with the invention read from the following description of a preferred example embodiment as merely shown diagrammatically in the corresponding drawings in which.

DETAILED DESCRIPTION OF THE INVENTION

Figure 1:
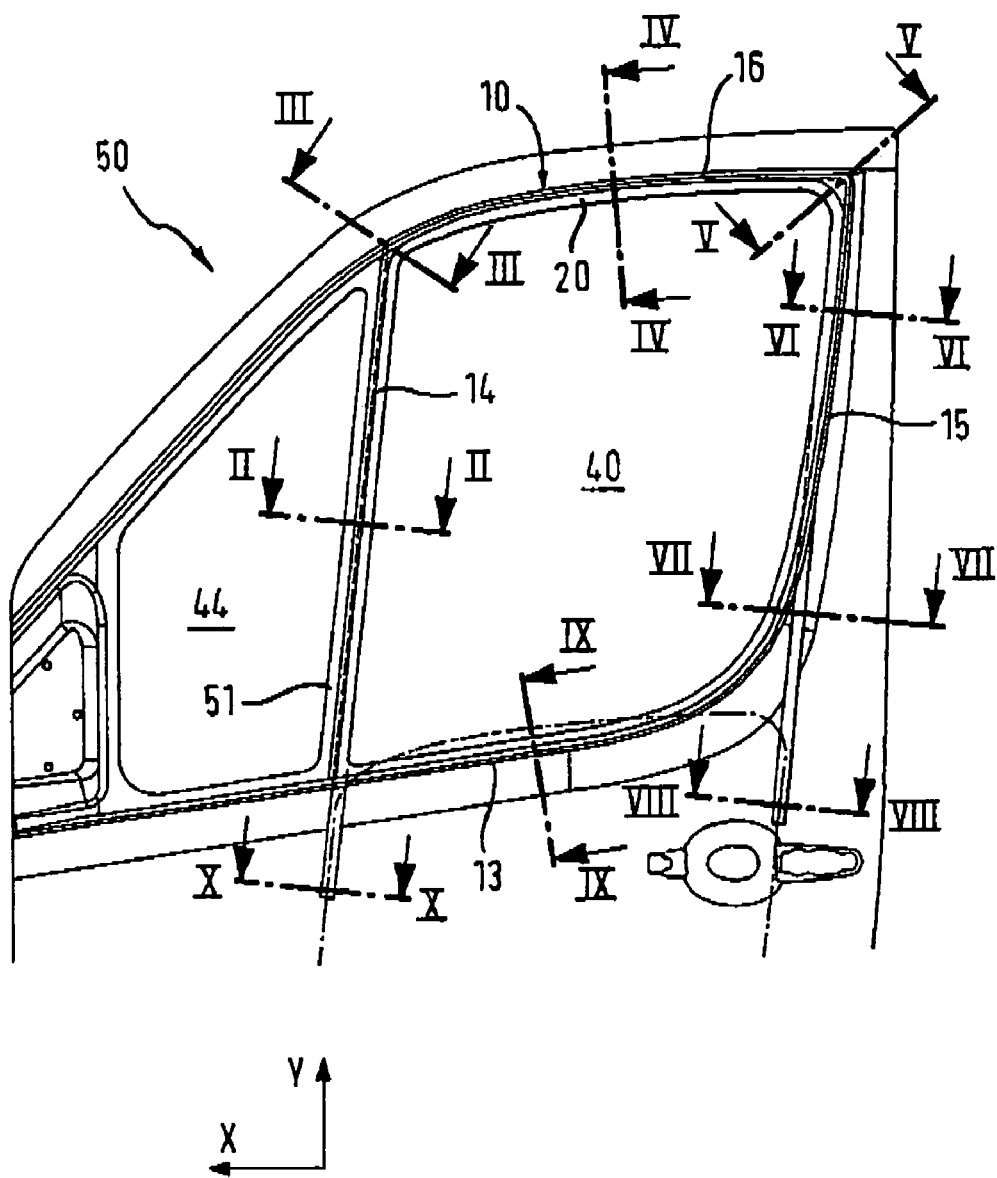
FIG. 1 is a side view of a door of a motor vehicle.
Figure 2:
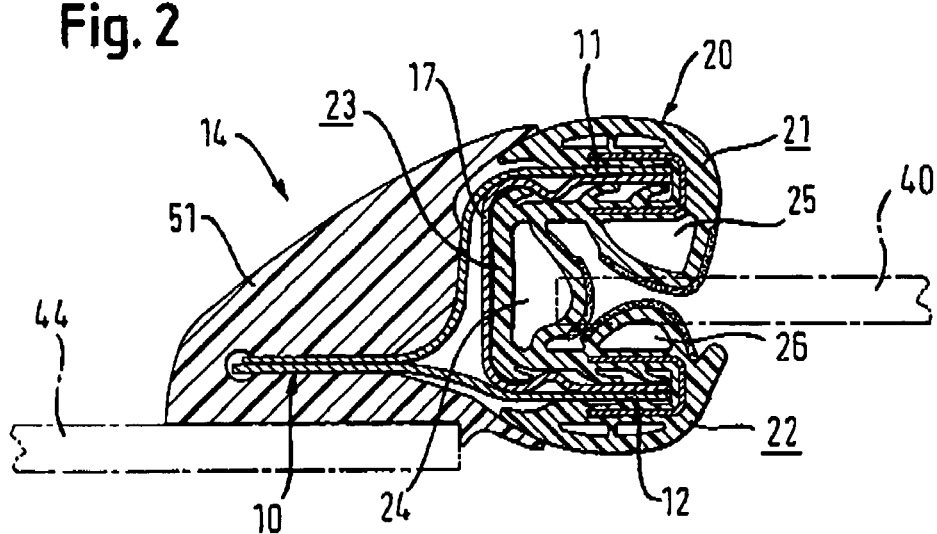
FIG. 2 is a section taken along the line II-II in FIG. 1.

Referring now to FIG. 1 there is illustrated a door 50 of a motor vehicle comprising a window pane 40 powered in the vertical direction y and a dead window pane 44. The window pane 40 can be lowered into a cavity of the door 50 and is framed by a sash 10 formed by the door 50. The sash 10 comprises an inner flange 11 facing the interior of the motor vehicle and an outer flange 12 spaced away from the inner flange 11. The inner flange 11 and outer flange 12 form a cavity portion 13 in the region of the door cavity receiving the window pane, a first guiding portion 14 guiding the side edge of the window pane 40 facing the dead window pane 44 in the region of the A-pillar of the motor vehicle, a second guiding portion 15 guiding the side edge of the window pane 40 facing away from the dead window pane 44 in the region of the B-pillar of the motor vehicle, and a receiving portion 16 receiving the upper edge of the window pane 40. As particularly evident from FIG. 11 the sash 10 comprises additionally portion-wise a middle segment 17 interconnecting the inner flange 11 and outer flange 12. For this purpose the middle segment 17 is configured cross-sectionally roughly U-shaped, the legs of the middle segment 17 forming part of the inner flange 11 and outer flange 12.

Figure 11:
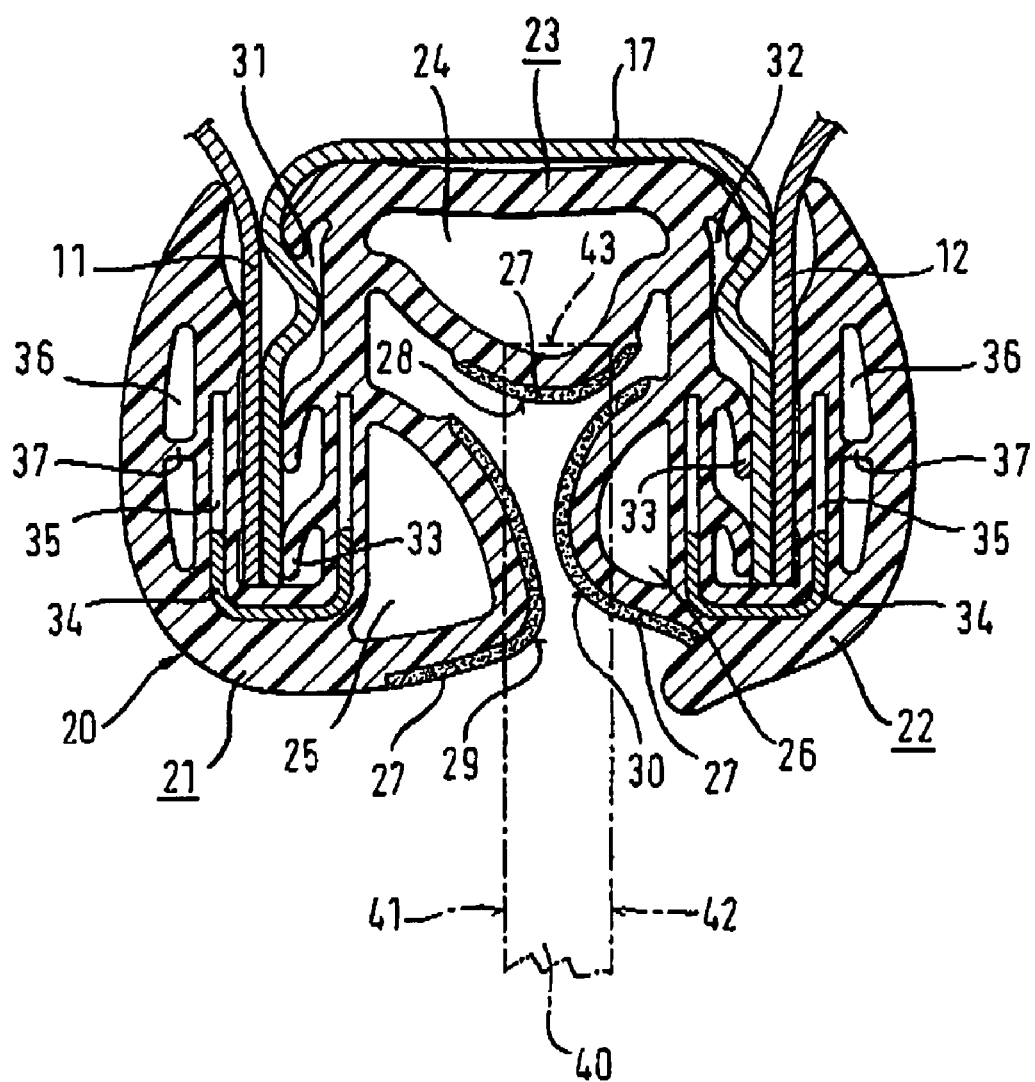
FIG. 11 is a cross-section through the sealing arrangement in accordance with the invention.

Still referring to FIG. 11 there is illustrated additionally how a seal 20 sealing and guiding the window pane 40 is secured to the sash 10. The seal 20 having a roughly U-shaped cross-section is extruded in one piece, for example, from EPDM and comprises an inner leg portion 21 secured to the inner flange 11 and an outer leg portion 22 secured to the outer flange 12. Moreover, the seal 20 is provided portion-wise with a base portion 23 arranged on the middle segment 17 and connecting the inner leg portion 21 to the outer leg portion 22. For securing the seal 20 to the sash 10 the inner leg portion 21 and outer leg portion 22 are each provided with a slot 31, 32. The slot 31 is mounted on the inner flange 11 whereas the slot 32 is mounted on the outer flange 12. To achieve an effective positive and non-positive connection between the inner flange 11 and slot 31 as well as between the outer flange 12 and the slot 32 additional retaining lips 33 are included in the slots 31, 32.

Furthermore, the inner leg portion 21 and outer leg portion 22 are each strengthened by a bracing element 34 roughly U-shaped in cross-section for clasping the slots 31, 32. The bracing elements 34 made of a metallic material comprise a plurality of perforations 35 ensuring adequate conformability of the bracing element 34. To avoid hungry horse furrows materializing when extruding the seal 20 as a result of the perforations 35 of the bracing element 34 at the surface of the seal 20, the inner leg portion 21 and outer leg portion 22 are provided with hollow chambers 36 which partly conceal the bracing element 34 and which are divided into two portions by a web 37. The web 37 ensures that the hollow chambers 36 remain intact when extruding the seal 20.

As evident from FIG. 11 additionally each base portion 23, inner leg portion 21 and outer leg portion 22 is provided with a sealing element 24, 25, 26 sealing and guiding the window pane 40. The sealing element 24 arranged at the base portion 23 is configured as a hollow chamber and provided with a surface area 28 contacting the end face 43 of the window pane 40. The inner sealing element 25 arranged at the inner leg portion 21 and the outer sealing element 26 arranged at the outer leg portion 22 are likewise configured as hollow chambers and provided with surface areas 28, 30 contacting the side surface 41, 42 of the window pane 40. All of the contact surface areas 28, 29, 30 are provided with a flock coating 27 preventing, or at least minimizing, nuisance creaking when the window pane 40 is powered.

Figure 3:
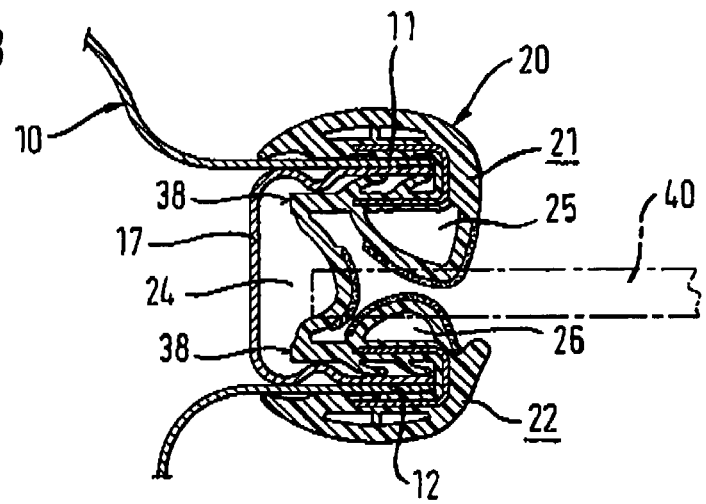
FIG. 3 is a section taken along the line III-III in FIG. 1.
Figure 4:
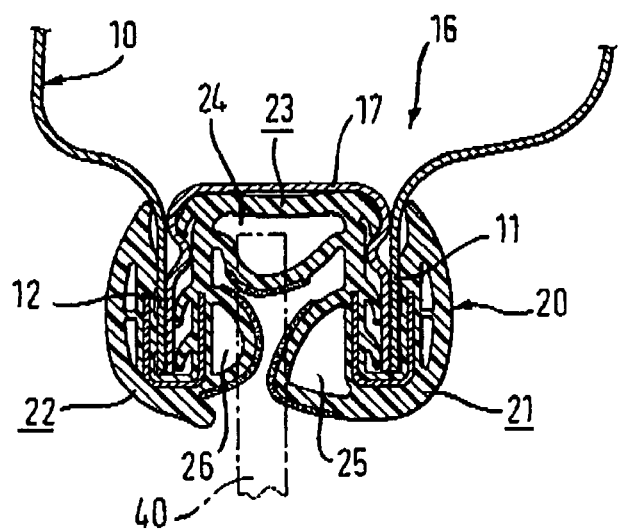
FIG. 4 is a section taken along the line IV-IV in FIG. 1.
Figure 5:
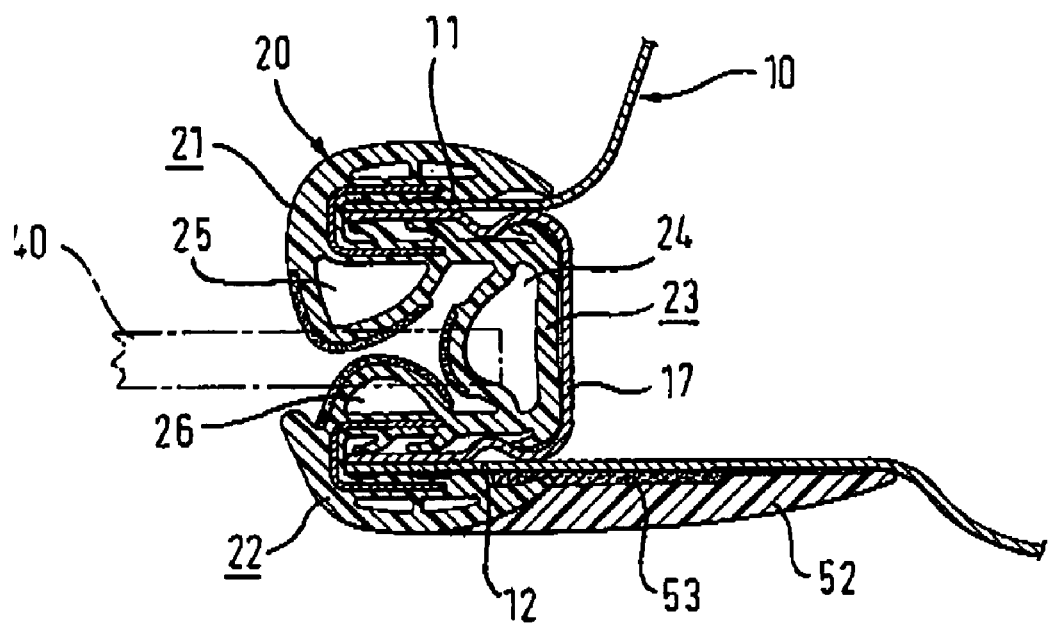
FIG. 5 is a section taken along the line V-V in FIG. 1.

Referring now to FIGS. 2 to 10 there is illustrated how the seal 20 is arranged in one piece along the sash 10. As particularly evident from FIGS. 2, 3 and 10 the sash 10 comprises in the region of the first guiding portion 14 the middle segment 17 connecting the inner flange 11 to the outer flange 12 and is arranged on the base portion 23. Arranged furthermore at the sash 10 in the region of the first guiding portion 14 is a seal 51 which seals the window pane 44, as evident from FIG. 2. Referring now to FIG. 3 there is illustrated how at the transition between the first guiding portion 14 and receiving portion 16 a part of the base portion 23 is removed along the section surface areas 38 to permit bending of the seal 20. As evident from FIGS. 4 and 5 the sash 10 also comprises in the region of the receiving portion 16 the middle segment. Likewise evident from FIG. 5 is how a molding 52 serving as a gusset in the transition from the receiving portion to the second guiding portion is secured by means of adhesive tape 53 or clip fastener to the sash 10 to conceal the gap resulting from the bend in the seal 20 in the transition portion.

Figure 6:
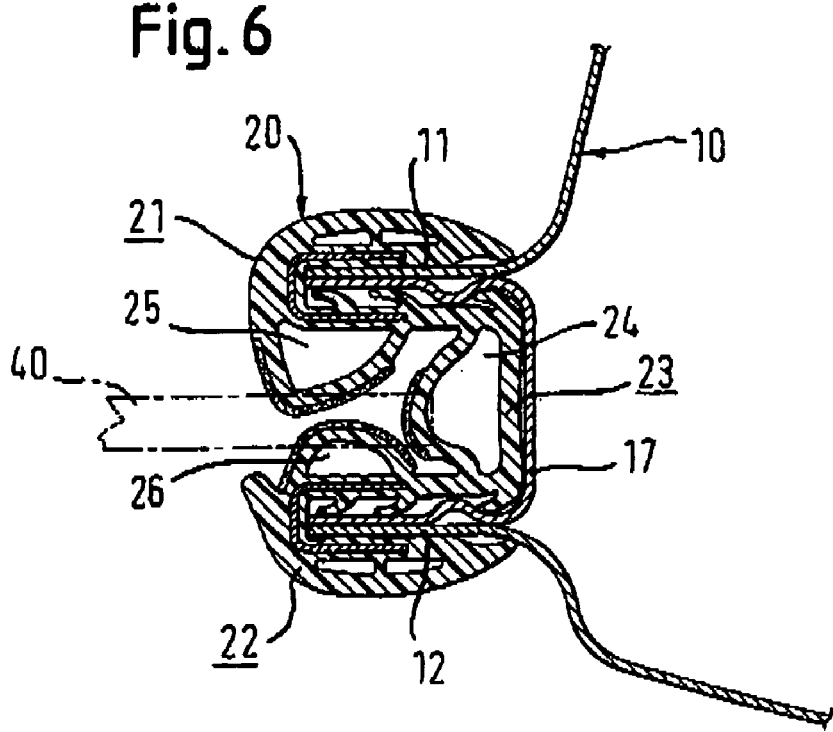
FIG. 6 is a section taken along the line VI-VI in FIG. 1.
Figure 7:
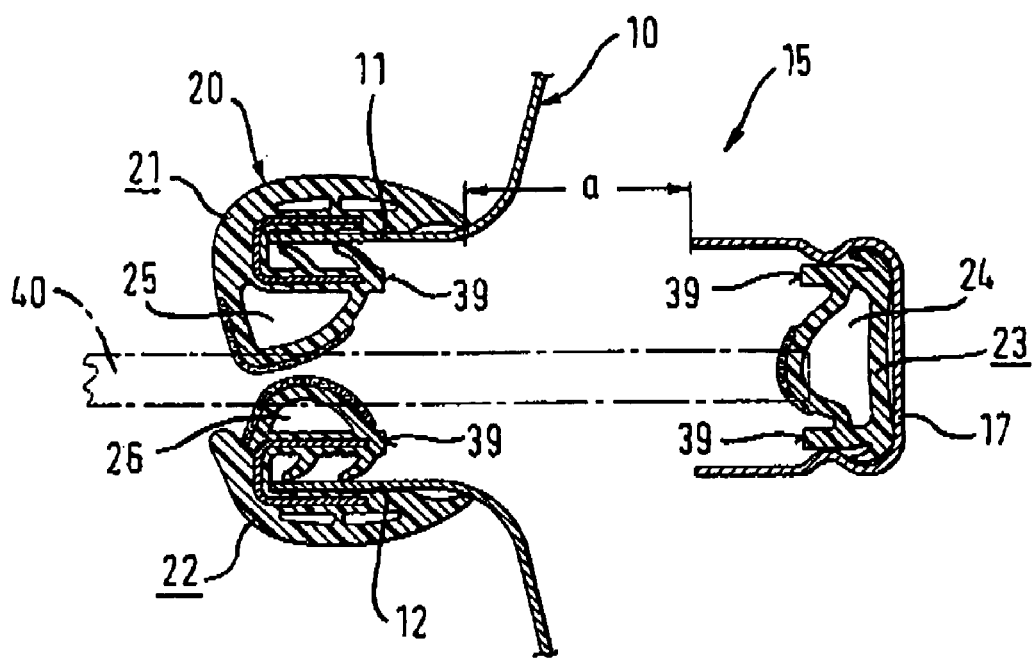
FIG. 7 is a section taken along the line VII-VII in FIG. 1.
Figure 8:
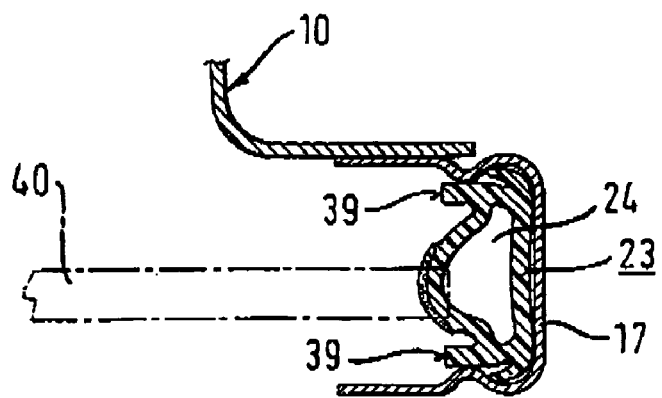
FIG. 8 is a section taken along the line VIII-VIII in FIG. 1.
Figure 9:
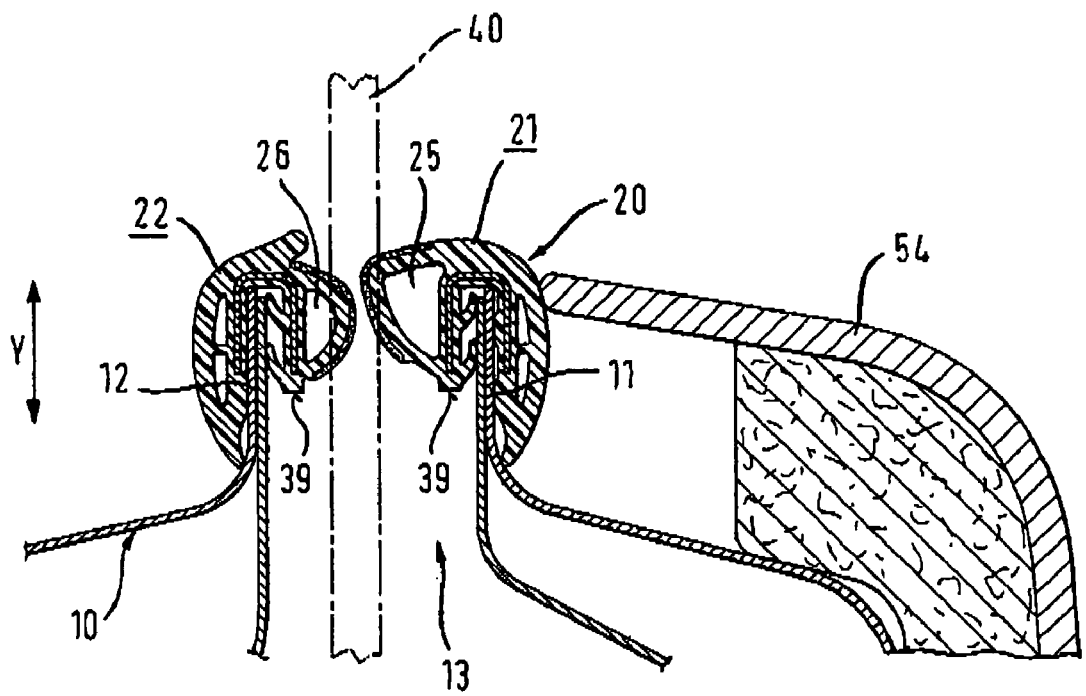
FIG. 9 is a section taken along the line IX-IX in FIG. 1.
Figure 10:
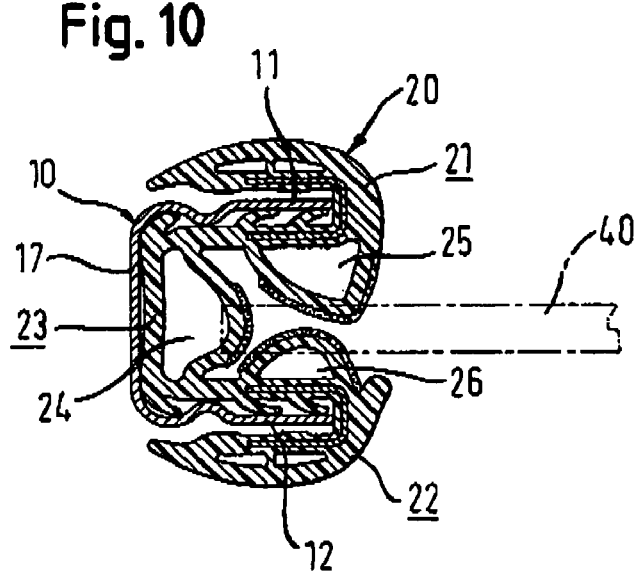
FIG. 10 is a section taken along the line X-X in FIG. 1.

Referring now to FIGS. 6 to 8 there is illustrated in particularly how the middle segment 17 of the sash 10 is arranged in the region of the second guiding portion 15 at a spacing a away from the inner flange 11 and the outer flange 12 and how the spacing a widens continuously in the direction of the cavity portion 13. The base portion 23 arranged on the middle segment 17 is separated from the inner leg portion 21 and outer leg portion 22 along the section surface areas 39. The leg portions 21, 22 separated from the base portion 23 translate curved into the cavity portion 13, whereas the middle segment 17 and the base portion 23 secured to the latter extend practically perpendicularly into the door cavity receiving the window pane 40. Referring now to FIG. 9 there is illustrated how in the region of the cavity portion 13 the sash 10 thus comprises no middle segment 17 and the seal 20 no base portion 23, resulting in the inner leg portion 21 guided on the inner flange 11 forming an internal door cavity seal adjoining an inner trim 54 of the door 50 and the outer leg portion 22 guided on the outer flange 12 forms an outer door cavity seal.

The sealing arrangement as described above for sealing and guiding the powered window pane 40 is characterized by relatively cost-effective production, because of the integral seal 20 being arranged in one piece along the whole of the sash 10. Moreover, the seal 20 now features a universal design taking into account the various requirements on the seal 20 in the functional portions: cavity portion 13, first guiding portion 14, second guiding portion 15 and receiving portion 16 as is primarily due to configuring the inner sealing element 25 and outer sealing element 26 as asymmetrical hollow chambers between which the window pane 40 is powered. The sealing elements 25, 26 comprise as a result of the hollow chamber design contact surface areas 29, 30 contacting the side surfaces 41, 42 of the window pane 40. These contact surface areas 29, 30 are configured such that the window pane 40 can now be reversibly powered between the inner sealing element 25 and outer sealing element 26 in both an arrangement of the inner sealing element 25, outer sealing element 26 in approximately the horizontal direction x as in the region of the cavity portion 13 and receiving portion 16 and in an arrangement of the inner sealing element 25, outer sealing element 26 in approximately the vertical direction y as in the region of the first guiding portion 14 and second guiding portion 15. Last but not least, because of the diversion of the base portion 23 and the leg portions 21, 22 in the region of the second guiding portion 15 the sealing arrangement as described above now permits designing the door 50 with highlighted visual appeal other than that of conventional vehicle doors.

LIST OF REFERENCE SIGNS 10 sash
11 inner flange
12 outer flange
13 cavity portion
14 first guiding portion
15 second guiding portion
16 receiving portion
17 middle segment
20 seal
21 inner leg portion
22 outer leg portion
23 base portion
24 central sealing element
25 inner sealing element
26 outer sealing element
27 flock coating
28 contact surface area
29 contact surface area
30 contact surface area
31 slot
32 slot
33 retaining lip
34 bracing element
35 perforation
36 hollow chamber
37 web
38 section surface area
39 section surface area
40 window pane
41 side surface 42 side surface
43 end face
44 window pane
50 door
51 seal
52 gusset
53 adhesive tape
54 inner trim
a spacing
x horizontal direction
y vertical direction

What is claimed is:

1. A sealing arrangement for sealing and guiding a movable window pane, particularly of a motor vehicle, comprising:
   sash framing the window pane, the sash comprising an inner flange and an outer flange spaced away from the inner flange, and a middle segment, the inner flange and the outer flange form a door-cavity section for accommodating the window pane when lowered, the inner flange and the outer flange form further a first guiding portion and a second guiding portion for guiding the window pane; and
   a seal having a nearly U-shaped cross-section and being made integrally of an elastomer, the seal comprising an inner leg portion securable to the inner flange, an outer leg portion securable to the outer flange and, remote from the door-cavity portion, a base portion positioned on the middle segment;
   the middle segment connecting the inner flange and the outer flange at least in the area of the first guiding portion, the middle segment being positioned at a distance from the inner flange and the outer flange in the area of the second guiding portion;
   the base portion being positioned at a distance from the inner leg portion and the outer leg portion in the area of the second guiding portion;
   the base portion, the inner leg portion and the outer leg portion each having a sealing element;
   an inner sealing element being arranged on the inner leg portion and an outer sealing element being arranged on the outer leg portion, the inner sealing element and the outer sealing element each being configured as a hollow chamber and having surface area for contacting a side surface of the window pane;
   the contact surface areas being configured in two directions each perpendicular to the other such that the window pane can be powered reversible between the inner sealing element and the outer sealing element.

2. The sealing arrangement as set forth in claim 1, wherein a central sealing element arranged on said base portion is configured as a hollow chamber and provided with a surface area for contacting an end face of said window pane.

3. The sealing arrangement as set forth in claim 1, wherein at least one of said contact surface areas is provided with a friction-reducing flock coating.

4. The sealing arrangement as set forth in claim 1, wherein said inner leg portion is provided with a slot for engaging said inner flange.

5. The sealing arrangement as set forth in claim 4, wherein said sealing arrangement comprises retaining lips arranged in said slot.

6. The sealing arrangement as set forth in claim 1, wherein said outer leg portion is provided with a slot for engaging said outer flange.

7. The sealing arrangement as set forth in claim 1, wherein said sealing arrangement comprises a bracing element for strengthening at least one of said inner leg portion and said outer leg portion.

8. The sealing arrangement as set forth in claim 7, wherein at least one of said inner leg portion and said outer leg portion is provided with a hollow chamber covering said bracing element at least in part.

9. The sealing arrangement of claim 8 in which said hollow chamber is divided into several portions by at least one web.

10. The sealing arrangement of claim 7 in which said bracing element is made of a metallic material and configured generally U-shaped in cross-section and with a plurality of perforations.

11. The sealing arrangement as set forth in claim 1, wherein said seal is extruded from a material selected from the group consisting of elastomers, thermoplastic elastomers and ethylene propylene diene monomers.

12. The sealing arrangement as set forth in claim 1, wherein said sash comprises a middle segment interconnecting said inner flange and said outer flange in the region of at least one of said first guiding portion and of a portion receiving said upper edge of said window pane.

13. The sealing arrangement as set forth in claim 12, wherein said base portion is arranged on said middle segment.

14. The sealing arrangement as set forth in claim 12, wherein said sash comprises a second guiding portion in which said middle segment is separated from said inner flange and said outer flange and said base portion is separated from said inner leg portion and said outer leg portion.

15. The sealing arrangement as set forth in claim 14, wherein said sealing arrangement comprises a spacing between said middle segment and said inner flange and said outer flange such that it is, continuously rendered wider along said second guiding portion.

16. The sealing arrangement of claim 12 in which said middle segment has a generally U-shaped cross-section.

* * * * *